T. H. WARD & C. R. YERRICK.
HAND WHEEL LOCK.
APPLICATION FILED NOV. 27, 1908.
928,893.
Patented July 20, 1909.
2 SHEETS—SHEET 1.
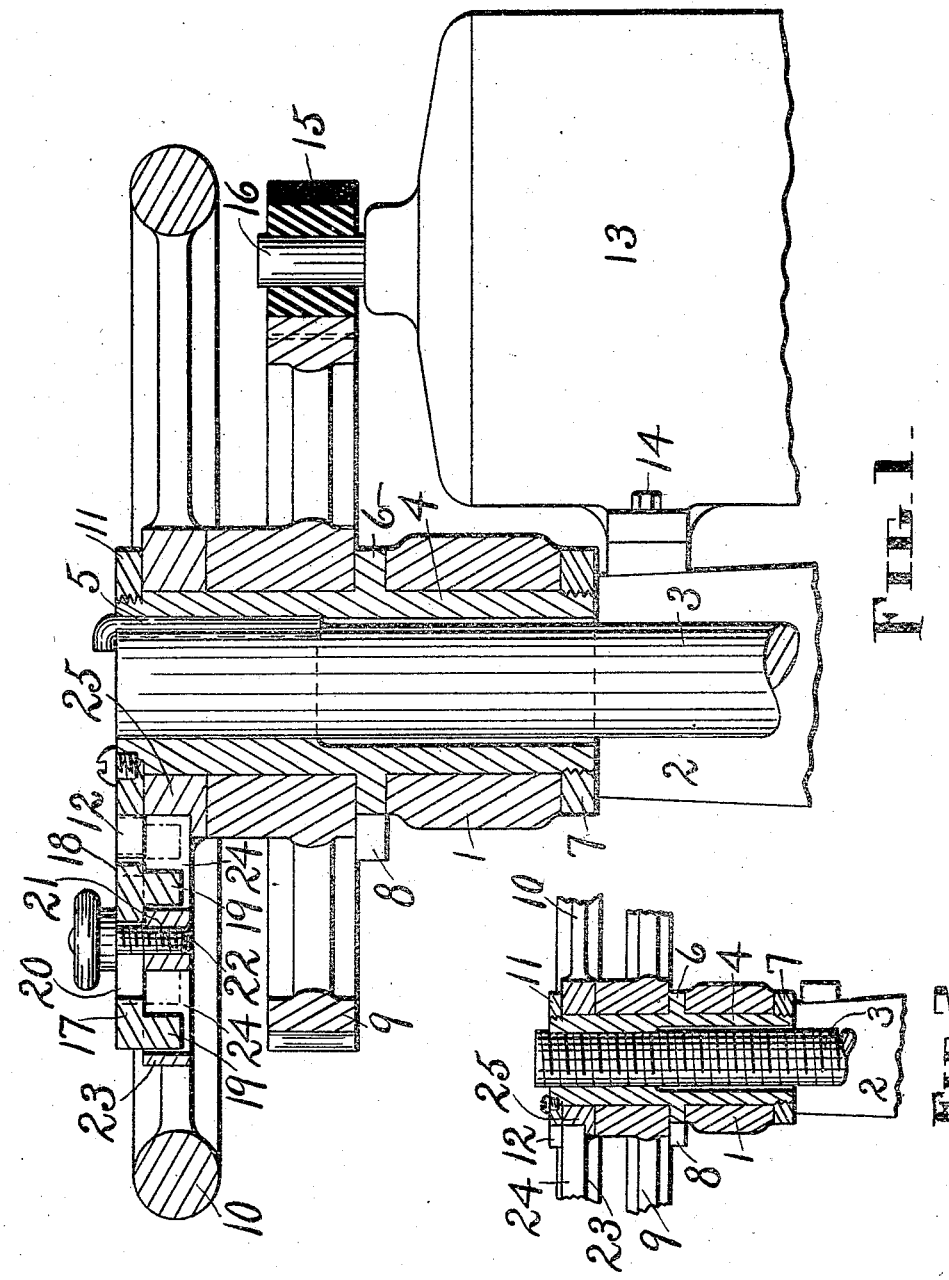
WITNESSES:
A. C. Fairbanks.
J. M. Sterne
INVENTORS
Thomas H. Ward,
Charles R. Yerrick,
BY
Webster & Co.,
ATTORNEYS

T. H. WARD & C. R. YERRICK.
HAND WHEEL LOCK.
APPLICATION FILED NOV. 27, 1908.

928,893.

Patented July 20, 1909.
2 SHEETS—SHEET 2.

WITNESSES:
A. C. Fairbanks.
J. M. Sterns

INVENTORS
Thomas H. Ward,
Charles R. Yerrick,
BY
Webster & Co,
ATTORNEYS.

UNITED STATES PATENT OFFICE.

THOMAS H. WARD, OF SPRINGFIELD, MASSACHUSETTS, AND CHARLES R. YERRICK, OF AVOCA, PENNSYLVANIA, ASSIGNORS TO CHAPMAN VALVE MANUFACTURING COMPANY, OF INDIAN ORCHARD, MASSACHUSETTS, A CORPORATION OF MASSACHUSETTS.

HAND-WHEEL LOCK.

No. 928,893.      Specification of Letters Patent.      Patented July 20, 1909.

Original application filed May 5, 1908, Serial No. 431,042. Divided and this application filed November 27, 1908. Serial No. 464,778.

*To all whom it may concern:*

Be it known that we, THOMAS H. WARD, residing at Springfield, in the county of Hampden and State of Massachusetts, and CHARLES R. YERRICK, residing at Avoca, in the county of Luzerne and State of Pennsylvania, both citizens of the United States of America, have invented a new and useful Hand-Wheel Lock, of which the following is a specification, the same being a divisional part of our application for patent filed in the United States Patent Office May 5, 1908, and serially numbered 431,042.

Our invention relates to improvements in mechanism for connecting and disconnecting the hand-wheel with and from the spindle of a valve and more particularly of a motor-driven valve, such connection being for the purpose of actuating said spindle through the medium of said hand-wheel when the motor is not in operation; and to this end we provide said hand-wheel with a certain peculiar bolt, lock, or latch which is adjustable in and out of the path of travel of a "bump" or lug on the spindle sleeve, and means to secure such latch in either of these positions, all as hereinafter set forth.

The objects of our invention are, first, to provide a simple and inexpensive lock, of the class specified above, which is also strong, durable, and efficient, and positive when in operative connection with the sleeve of the valve-spindle; second, to furnish in such a lock means whereby the lock can be easily and quickly adjusted, and, third, to afford convenient means for securing said lock after adjustment and releasing it for adjustment. We attain these objects by the means illustrated in the accompanying drawings, in which—

Figure 3:
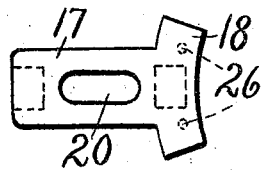
Figure 4:
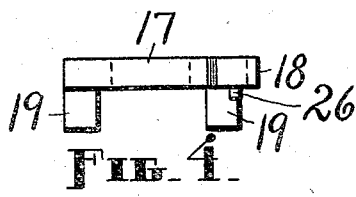
Figure 5:
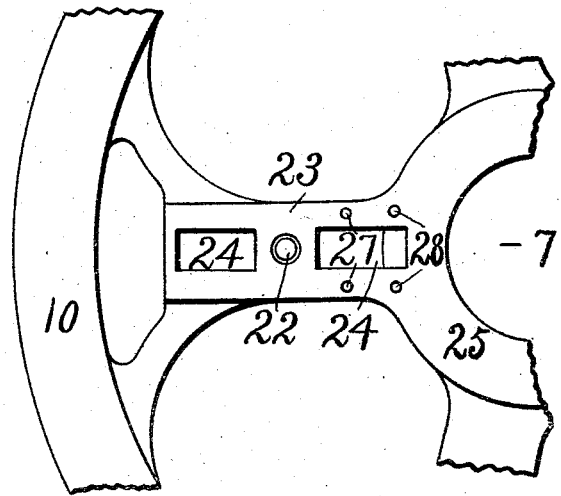
Figure 6:
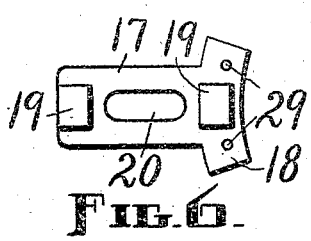
Figure 7:
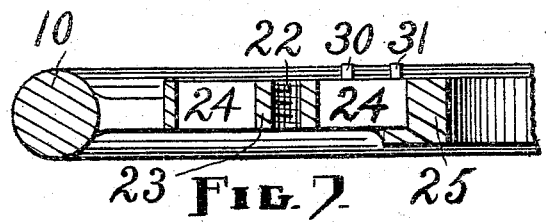

Figure 1 is a sectional view of the upper part of a valve mechanism in which our invention is incorporated, a portion of the motor which usually drives such mechanism being shown in elevation; Fig. 2, a sectional view on a reduced scale of an outside-screw construction, that shown in the preceding view being an inside-screw construction; Fig. 3, a top view of the latch which forms a part of our invention; Fig. 4, a side elevation of said latch; Fig. 5, a plan view of that part of the hand-wheel with which the aforesaid latch is connected; Fig. 6, a bottom view of the latch, showing holes instead of the pins which appear or are indicated in Figs. 3 and 4, and, Fig. 7, a vertical section on lines 7—7, Fig. 5, pins being shown to take the place of the holes in said Fig. 5.

Similar figures refer to similar parts through the several views.

In the first view are shown the following parts of an ordinary valve of the inside-screw variety: a yoke-head 1 and portion of a yoke 2, the upper terminal of a valve-spindle 3, a sleeve 4 keyed to said spindle at 5 and secured in said yoke-head by means of an integral flange 6 above and a lock-ring 7 below, said flange having a bump or lug 8 projecting from one side thereof, a driving-gear 9 loose on said sleeve above the flange, a hand-wheel 10 loose on the sleeve above said gear, and a lock-ring 11 tight on the sleeve above said hand-wheel, said last-mentioned ring having a bump or lug 12 similar to the lug 8. The upper portion of a motor 13 bolted at 14 to said yoke and a pinion 15 tight on the motor shaft 16 and in mesh with the gear 9 are also shown. In Fig. 2, corresponding parts of a valve of the outside-screw variety appear, the valve spindle 3 in this case being in threaded engagement with the sleeve 4, instead of being keyed thereto.

By connecting the driving-gear 9 with the sleeve 4, through the medium of a lock member carried by said gear and adapted to engage the lug 8, as set forth in the aforesaid application of which this is a divisional part, the valve spindle 3 can be revolved by the motor 13 through the medium of the pinion 15, and by disconnecting said gear and connecting the hand-wheel 10 with said sleeve said spindle can be rotated by means of said hand-wheel. When the driving-gear is the actuating medium for the spindle it is desirable that the hand-wheel be disconnected, since it then requires less power to start the spindle with the motor, very little momentum on the part of the hand-wheel has to be overcome when the spindle stops, and shock and jar are avoided; and when the hand-wheel is the actuating medium the driving-gear should be disconnected, as here shown, in order to avoid the excessive labor that would otherwise be expended in the needless operation of rotating the two gears and the motor in addition to the valve-spindle.

The lock mechanism for the hand-wheel 10 comprises a body 17 provided with a segmental head 18 and two bottom lugs 19 and having a longitudinal slot 20 therein, and a hand-screw 21 passing downward through said slot into a tapped hole 22 in the center of an arm 23 of said hand-wheel. The arm 23 is slotted at 24—24 to receive the lugs 19 and form guides therefor and for the body 17 and head 18 which ride on said arm. The inner slot 24 extends part way into the hub 25 of the hand-wheel. The body 17 with its head 18 constitutes a latch or bolt.

The aforesaid bolt may be provided with one or two lock-pins 26 depending from the head 18, and if so holes 27 and 28 are arranged in the arm 23, the holes 27 to receive said pins when the bolt is positioned with its head out of engaging relation to or with the lock-ring lug 12, and the holes 28 to receive said pins when said bolt is positioned with said head in such engaging relation. The purpose of the pins 26 is to add greater security to the bolt and preclude any possibility of its getting loose especially in the event that said bolt be not properly secured by the hand-screw 21, but these pins and the holes therefor in the arm 23 are not required when said hand-screw is to be depended on solely to hold the bolt in place. As shown in the last two views, the pins and holes may be transposed, that is to say, there may be one or two holes 29 in the bottom of the head 18, instead of the pins 26, and corresponding pins 30 and 31 rising from the top of the arm 23, in place of the holes 27 and 28. In the first instance, the holes 27 receive the pins 26 when the bolt is in its inoperative or inactive position, and the holes 28 receive said pins when said bolt is in its operative or active position with the head 18 in engaging relation to or with the lock-ring lug 12; and in the second instance, the pins 30 are received into the holes 29 when the bolt is outwardly positioned, and the pins 31 are received into said holes 29 when the bolt is inwardly disposed.

Assuming, now, that the driving-gear 9 is unlocked from the sleeve 4, and that the bolt stands in its inoperative position, as shown in full lines in Fig. 1, we will explain the complete operation of our invention.

To bring the valve-stem 3 under the control of the hand-wheel 10, unscrew the hand-screw 21 sufficiently to enable the body 17 to be raised far enough above the arm 23 for the pins 26 to clear the edges of the holes 27, (or for the edges of the holes 29 to clear the pins 30), move said body forward, the lugs 19 sliding in the slots 24, until the pins 26 enter the holes 28, (or until the pins 31 are received into the holes 29), and refasten with said hand-screw by rotating it in the right direction to cause the body to be tightly grasped between the top of said arm and the head of the screw. The bolt now stands as indicated by broken lines in Fig. 1, with the head 18 in the path of travel of the lug with which lug said head contacts when the hand-wheel is revolved and so imparts motion to the sleeve 4 and the connected spindle.

To disconnect the hand-wheel, for the purpose of restoring the valve-spindle to the control of the motor free from the impediment of a rotatably-connected hand-wheel, unscrew the hand-screw as before, move the bolt upward and outward into its normal position, and again tighten said hand-screw. The head 18 is now out of the path of travel of the lug 12.

In the absence of the lock-pins, less movement of the hand-wheel 21 is necessary to bind and release the bolt.

What we claim as our invention, and desire to secure by Letters Patent, is—

1. The combination, with a valve-spindle, and a rotary member therefor provided with a lug, of a hand-wheel loose on said member and having an arm with two slots therein, a slotted bolt mounted on such arm adjacent to such lug and provided with guide members projecting downward into the arm slots and with a head in the same plane with the orbit of said lug, such bolt being longitudinally movable on such arm so as to be positioned with its head either in or out of the path of travel of said lug, and a hand-screw which passes through the slot in the bolt into threaded engagement with the arm between the slots therein, and is capable of binding and thus securing the bolt to the arm and of releasing it therefrom at either end of the longitudinal movement of the bolt.

2. The combination, with a valve-spindle, a suitably supported sleeve operatively connected with such spindle, and a lock-ring fast to such sleeve and provided with a lug, of a hand-wheel loose on said sleeve below such ring and lug and having an arm with two slots therein, a slotted bolt mounted on such arm and provided with guide members projecting downward into the arm slots and with a head in the same plane with the orbit of said lug, such bolt being longitudinally movable on said arm so as to be positioned with its head either in or out of said orbit, and a hand-screw which passes through the slot in the bolt into threaded engagement with the arm between the slots therein, and is capable of binding and thus securing the bolt to the arm and of releasing it therefrom at either end of the longitudinal movement of the bolt.

THOMAS H. WARD.
CHARLES R. YERRICK.

Witnesses:
F. A. CUTTER,
A. C. FAIRBANKS,
G. W. HOLLISTER,
M. J. O'MALLEY.